US011777106B2

(12) United States Patent
Morimitsu (10) Patent No.: US 11,777,106 B2
(45) Date of Patent: Oct. 3, 2023

(54) OXYGEN CATALYST, ELECTRODE USING THE SAME, AND ELECTROCHEMICAL MEASUREMENT METHOD

(71) Applicant: THE DOSHISHA, Kyoto (JP)

(72) Inventor: Masatsugu Morimitsu, Kyotanabe (JP)

(73) Assignee: THE DOSHISHA, Kyoto (JP)

( * ) Notice: Subject to any disclaimer, the term of this patent is extended or adjusted under 35 U.S.C. 154(b) by 0 days.

(21) Appl. No.: 17/999,425

(22) PCT Filed: May 19, 2021

(86) PCT No.: PCT/JP2021/019061
§ 371 (c)(1),
(2) Date: Nov. 21, 2022

(87) PCT Pub. No.: WO2021/235497
PCT Pub. Date: Nov. 25, 2021

(65) Prior Publication Data
US 2023/0197973 A1    Jun. 22, 2023

(30) Foreign Application Priority Data

May 21, 2020 (JP) ................................. 2020-089223

(51) Int. Cl.
*H01M 4/90* (2006.01)
*C25B 11/063* (2021.01)
(Continued)

(52) U.S. Cl.
CPC ......... *H01M 4/9016* (2013.01); *C25B 11/063* (2021.01); *C25B 11/091* (2021.01); *H01M 12/04* (2013.01)

(58) Field of Classification Search
CPC . B01J 23/04; B01J 23/18; B01J 23/462; B01J 23/58; B01J 23/6447; B01J 35/0033;
(Continued)

(56) References Cited

U.S. PATENT DOCUMENTS 4,089,810 A * 5/1978 Diwell ..................... B01J 23/58
502/328
2011/0294652 A1   12/2011 Sato et al.
(Continued)

FOREIGN PATENT DOCUMENTS

EP    3084867 B1 * 5/2021 ........... C25B 11/091
EP    4106053 A1 * 12/2022 ............. H01M 4/24
(Continued)

OTHER PUBLICATIONS

Myeongjin Kim et al., "Single crystalline Bi2Ru2O7 pyrochlore oxide nanoparticles as efficient bifunctional oxygen electrocatalyst for hybrid Na-air batteries." Chemical Engineering Journal 358, pp. 11-19. (Year: 2019).*
(Continued)

*Primary Examiner* — Patricia L. Hailey
(74) *Attorney, Agent, or Firm* — KENJA IP LAW PC (57) ABSTRACT

In a case where an alkali aqueous solution is used as an electrolyte, provided are an oxygen catalyst excellent in catalytic activity and composition stability, an electrode having high activity and stability using this oxygen catalyst, and an electrochemical measurement method that can evaluate the catalytic activity of the oxygen catalyst alone. The oxygen catalyst is an oxide having peaks at positions of $2\theta = 30.07° \pm 1.00°$, $34.88° \pm 1.00°$, $50.20° \pm 1.00°$, and $59.65° \pm 1.00°$ in an X-ray diffraction measurement using a CuKα ray, and having constituent elements of bismuth, ruthenium, sodium, and oxygen. An atom ratio O/Bi of oxygen to bismuth and an atom ratio O/Ru of oxygen to ruthenium are both more than 3.5.

16 Claims, 5 Drawing Sheets

(51) Int. Cl.
*C25B 11/091* (2021.01)
*H01M 12/04* (2006.01)

(58) Field of Classification Search
CPC . C01P 2002/72; H01M 4/9016; H01M 12/04; C25B 11/063; C25B 11/091
USPC .................................................. 502/330, 353
See application file for complete search history.

(56) References Cited

U.S. PATENT DOCUMENTS

| | | | |
|---|---|---|---|
| 2012/0053045 A1 | 3/2012 | Sato et al. | |
| 2012/0140378 A1 | 6/2012 | Tan et al. | |
| 2013/0302705 A1 | 11/2013 | Yoshida et al. | |
| 2013/0330651 A1 | 12/2013 | Thompsett et al. | |
| 2015/0228984 A1 | 8/2015 | Ball et al. | |
| 2017/0294669 A1 | 10/2017 | Haugen et al. | |
| 2021/0043945 A1 | 2/2021 | Unoki et al. | |
| 2022/0085387 A1* | 3/2022 | Morimitsu | B01J 23/656 |
| 2022/0359884 A1* | 11/2022 | Inoue | H01M 10/26 |

FOREIGN PATENT DOCUMENTS

| | | | | | |
|---|---|---|---|---|---|
| JP | 2010184824 A | 8/2010 | | | |
| JP | 2012049075 A | 3/2012 | | | |
| JP | 2014504433 A | 2/2014 | | | |
| JP | 2014505321 A | 2/2014 | | | |
| JP | 2014220111 A | 11/2014 | | | |
| JP | 2015046403 A | 3/2015 | | | |
| JP | 2015529945 A | 10/2015 | | | |
| JP | 2016152068 A | 8/2016 | | | |
| JP | 2017063020 A | 3/2017 | | | |
| JP | 2018503942 A | 2/2018 | | | |
| JP | 2018149518 A | 9/2018 | | | |
| JP | 2019179592 A | 10/2019 | | | |
| JP | 2019195775 A | 11/2019 | | | |
| JP | 2020077469 A | 5/2020 | | | |
| JP | 2022061331 A | * | 4/2022 | | H01M 10/26 |
| WO | WO-2012080726 A1 | * | 6/2012 | | H01M 4/8615 |
| WO | 2012111101 A1 | | 8/2012 | | |

OTHER PUBLICATIONS

English translation of the Written Opinion for PCT/JP2021/019061. (Year: 2021).*
R. Martínez-Coronado et al., Crystal and magnetic structure of the Bi2RuMnO7 pyrochlore: A potential new cathode for solid oxide fuel cells, Journal of Power Sources, 2014, pp. 876-882, vol. 247.
Rohini Mani et al., Ruthenium(IV) pyrochlore oxides: Realization of novel electronic properties through substitution at A- and B-sites, Solid State Sciences, 2009, pp. 189-194, vol. 11.
Nov. 17, 2022, International Preliminary Report on Patentability issued in the International Patent Application No. PCT/JP2021/019061.
Aug. 10, 2021, International Search Report issued in the International Patent Application No. PCT/JP2021/019061.
Aug. 25, 2020, Notification of Reasons for Refusal issued by the Japan Patent Office in the corresponding Japanese Patent Application No. 2020-089223.
Sep. 29, 2020, Decision to Grant a Patent issued by the Japan Patent Office in the corresponding Japanese Patent Application No. 2020-089223.

* cited by examiner

OXYGEN CATALYST, ELECTRODE USING THE SAME, AND ELECTROCHEMICAL MEASUREMENT METHOD

TECHNICAL FIELD

This disclosure relates to an oxygen catalyst that uses an alkali aqueous solution as an electrolyte and is used in reduction reaction in which oxygen is reduced to produce hydroxide ions and/or oxidation reaction in which hydroxide ions are oxidized to produce oxygen, an electrode using this oxygen catalyst, and an electrochemical measurement method.

BACKGROUND

Oxygen catalysts catalyze the reduction of oxygen, the generation of oxygen, or both of them. For example, in an air battery that uses an alkaline aqueous solution (hereinafter, abbreviated to an alkali aqueous solution) such as a lithium hydroxide aqueous solution, a potassium hydroxide aqueous solution, and a sodium hydroxide aqueous solution, as an electrolyte, the following reactions in which hydroxide ions ($OH^-$) are produced in the alkali aqueous solution in the reduction of oxygen and hydroxide ions in the alkali aqueous solution are oxidized in the generation of oxygen are known:

Reduction: $O_2 + 2H_2O + 4e^- \rightarrow 4OH^-$      (1), and Oxidation: $4OH^- \rightarrow O_2 + 2H_2O + 4e^-$      (2).

Such reactions occur at the positive electrode in the air battery. In an air primary battery, the reduction reaction in formula (1) above occurs at the time of the discharge. In an air secondary battery, formula (1) above occurs in the discharge similarly to the air primary battery, while the oxidation reaction in formula (2) above occurs in the charge. Such battery is referred to as an air battery because oxygen in the air can be used for the discharge, and the positive electrode of the air battery is referred to as an air electrode for the same reason. However, oxygen used in the reaction of formula (1) above is not necessarily oxygen in the air, and it may be, for example, high purity oxygen.

The oxygen reduction reaction at the air electrode of the air battery that uses the alkali aqueous solution as described above is identical to the oxygen reduction reaction at the oxygen cathode of brine electrolysis that produces caustic soda and chlorine by electrolysis. Thus, these reactions can use identical oxygen catalysts. The identical oxygen reduction reaction also occurs at the cathode of an alkaline fuel cell during power generation. Thus, the identical oxygen catalysts can be used for the air electrode of the air battery, the oxygen cathode of the brine electrolysis, and the cathode of the alkaline fuel cell. Furthermore, the charge reaction (formula (2) above) at the air electrode of the air secondary battery is identical to the oxygen generation reaction at the anode of alkaline water electrolysis. Therefore, these reactions can use identical oxygen catalysts.

Any of the air battery, the brine electrolysis, the alkaline fuel cell, and the alkaline water electrolysis described above use the alkali aqueous solution as the electrolyte, and its operating temperature is from the room temperature to around 90° C. That is, the oxygen reaction that uses the alkali aqueous solution as the electrolyte is oxidation reaction or reduction reaction between oxygen and hydroxide ions in such temperature range, and the oxygen catalyst of this disclosure is a catalyst for these reactions. There are other electrochemical reactions that reduce oxygen or generate oxygen. For example, the reaction at the cathode of a solid oxide fuel cell (abbreviation: SOFC) is reduction reaction from oxygen to oxide ions ($O^{2-}$). The reaction at the anode of a solid oxide water electrolyzer (abbreviation: SOEC) is oxidation reaction from oxide ions to oxygen. Any of these reactions are reactions at high temperatures around from 600° C. to 1000° C. The oxygen reaction thus has different reaction mechanisms depending on temperature. The oxygen catalyst suitable for these reaction mechanisms naturally differ. Such difference in reaction mechanism results in significant differences in action mechanism and effect of the catalyst.

Not only the activity of the oxygen catalyst but also its stability greatly vary depending on temperature and reaction mechanism. For example, even if it was found that one catalyst has high activity at high temperatures of 600° C. or more, this catalyst does not necessarily have high catalytic activity similarly at temperatures of 100° C. or less. It is extremely difficult even for those skilled in the art to analogize or infer this kind of thing. Further, the catalyst in the electrochemical reaction at lower temperature, for example, at low temperature around the room temperature makes it difficult to develop higher activity for higher temperature. It is difficult to find a catalyst having higher activity at lower temperature at which it is used.

Here, as an air primary battery that uses the alkali aqueous solution as the electrolyte, a zinc air primary battery that uses zinc for the negative electrode has been put to practical use as a power source for hearing aid. Similar air primary batteries that use metal such as magnesium, calcium, aluminum, and iron other than zinc for the negative electrode have been developed. An air primary battery that uses the alkali aqueous solution as the electrolyte and uses magnesium for the negative electrode has been commercialized as an emergency power source. On the other hand, an air secondary battery that uses the alkali aqueous solution as the electrolyte has not been put to practical use yet, except for a mechanically rechargeable zinc air secondary battery that mechanically (physically) exchanges the negative electrode or the electrolytic solution to regenerate the discharge function. Then, a zinc air secondary battery that is not mechanically rechargeable and a hydrogen/air secondary battery that uses hydrogen absorbing alloys for the negative electrode have been developed. In these secondary batteries, the reaction of the negative electrode is different, but the reaction of the positive electrode (air electrode) is identical and expressed by the reaction formulae of formula (1) and formula (2) above. The present inventor has disclosed a hydrogen/air secondary battery in PTL 1.

Materials that have been used or considered so far for the oxygen catalyst at not only the air electrode of the air battery as described above, but also the oxygen cathode of the brine electrolysis, the cathode of the alkaline fuel cell, and the anode of the alkaline water electrolysis include numerous materials such as: noble metal such as platinum, silver, and gold and their alloys; platinum group metals and other transition metal elements, and alloys including them; various oxides and sulfides; doped or undoped carbon-based materials (including carbon having various crystal structures and forms, such as graphite, amorphous carbon, glassy carbon, carbon nanotube, carbon nanofiber, and fullerene); and various nitrides, carbides, and metallic organic compounds. Among them, as the oxides, oxides having crystal structures referred to as pyrochlore, perovskite, and spinel are known as the oxygen catalysts and disclosed in, for example, PTLs 1 to 4.

Specifically, PTL 1 describes a positive electrode of an air secondary battery that uses an alkaline aqueous solution as an electrolyte, and the positive electrode includes a nickel coating material including: a core material having a density lower than that of nickel; and a covering layer that contains nickel and/or nickel alloy, which coats the core material. PTL 1 discloses a catalyst that contains bismuth iridium oxide and/or bismuth ruthenium oxide with which this nickel coating material is mixed.

PTL 2 discloses a positive electrode catalyst of a metal air battery having an atom ratio expressed by $La_xSr_{3-x}Fe_{2-y}Co_yO_7$. PTL 2 describes that this catalyst exhibits excellent alkali tolerant and catalytic activity because at least a part of the Sr site of $Sr_3Fe_2O_7$ has been substituted by La or at least a part of the Fe site has been substituted by Co.

PTL 3 discloses an air battery including a negative electrode, an electrolyte layer interposed between an air electrode and the negative electrode, and an electrode catalyst, in which the electrode catalyst includes an oxide (oxide electrode catalyst) having activity for at least the oxygen reduction reaction, and the oxide electrode catalyst preferably contains at least one metal element selected from iron, cobalt, nickel, titanium, manganese, and copper and has a perovskite structure or a spinel structure.

PTL 4 discloses a method for producing a catalyst for an air secondary battery for use in an air electrode of the air secondary battery, the method comprising: a precursor preparation step of preparing a pyrochlore-type oxide precursor, a calcination step of calcining the pyrochlore-type oxide precursor to form a pyrochlore-type oxide, and an acid treatment step of immersing the pyrochlore-type oxide obtained from the calcination step in an acidic aqueous solution to apply an acid treatment, and such pyrochlore-type oxide includes an oxygen deficient type bismuth ruthenium oxide.

Here, as for the composition of an oxide having a pyrochlore structure, the general atom ratio is $A_2B_2O_7$ for an A site element (A), a B site element (B), and oxygen (O) in the crystal structure. However, it has been reported in numerous cases that the atomic ratios obtained from analysis results with actual oxides are not always such integers.

For example, as a bismuth ruthenium oxide (hereinafter, abbreviated to BRO) having a pyrochlore structure in which the A site is bismuth (Bi) and the B site is ruthenium (Ru), each BRO with an atom ratio expressed by:

$Bi_2Ru_2O_7$,
$Bi_2Ru_2O_{6.9}$,
$Bi_2Ru_2O_{6.92}$,
$Bi_{1.87}Ru_2O_{6.903}$,
$Bi_{1.88}Ru_2O_{6.906}$,
$Bi_{1.9}Ru_2O_{6.922}$,
$Bi_{1.9}Ru_2O_{6.928}$, and
$Bi_{1.9}Ru_2O_{6.901}$ has been registered in the database in International Centre for Diffraction Data. The BRO is thus known to have different atom ratios depending on the synthetic method and the synthesis conditions and is a compound whose composition is likely to change.

On the other hand, the oxygen catalyst that uses the alkali aqueous solution as the electrolyte is required to simultaneously have chemical and electrochemical stabilities under a strong alkaline environment and high catalytic activity for the oxygen reduction and/or the oxygen generation. That is, the oxygen catalyst is required to reduce not oxygen of the oxygen catalyst itself on its surface but oxygen in the air, and/or generate oxygen from hydroxide ions in the electrolyte, while keeping its own composition constant, for the oxygen reaction with a strong oxidizing atmosphere that occurs under the strong alkaline, highly corrosive environment. In the case of the oxygen reaction using a non-aqueous electrolyte, the oxygen catalyst is required to generate oxygen from $O_2^{2-}$, while keeping its own composition constant. In the case of the compound whose composition is likely to change, such as the BRO, a slight difference in composition (atom ratio) may provide high catalytic activity, while the oxygen reaction may change the composition of the catalyst itself to degrade the catalytic activity. There are many examples where the initial catalytic activity and its continuity are incompatible.

In addition, PTL 4 points out a problem that by-products formed during the synthesis of the oxygen deficient type BRO decrease the discharged capacity of the air secondary battery with a relatively small number of cycles. Furthermore, for this problem, PTL 4 discloses that: an atom ratio of Bi to Ru decreases by immersing the BRO obtained by the synthesis in an acid solution such as a nitric acid solution for a certain period of time, washing it with ion exchanged water, and then drying it (this operation is described as the "acid treatment"); the acid treatment improves the maintenance rate of the discharged capacity against the charge and discharge cycle with respect to a BRO to which such acid treatment is not applied; etc.

Here, for the oxide having the pyrochlore structure, with respect to the above general atom ratio $A_2B_2O_7$, when the atom ratio of oxygen is less than 7, it is referred to as an oxygen deficient type, and the atom ratio of oxygen is more than 7, it is referred to as an oxygen excess type.

CITATION LIST

Patent Literature

PTL 1: JP2016152068A
PTL 2: JP2018149518A
PTL 3: JP2015046403A
PTL 4: JP2019179592A

SUMMARY

Technical Problem

The BRO forms a pyrochlore structure with three elements of two metal elements, bismuth (Bi) at the A site and ruthenium (Ru) at the B site, and oxygen (O). The BRO has been expected to have high catalytic activity in both oxygen reduction and oxygen generation as the oxygen catalyst, also for the oxygen reaction that uses any electrolyte of an aqueous solution such as the alkali aqueous solution, or the non-aqueous electrolyte, as described above. The BRO has been developed also as an oxygen catalyst of the air electrode of the air secondary battery, which is required to have high catalytic activity in both oxygen reduction and oxygen generation. However, the BRO has different atom ratios of Bi, Ru, and O depending on its synthetic method or synthesis conditions. That is, the BRO is a compound whose composition is likely to change. Further, the BRO degrades the cycle characteristics of the air secondary battery because by-products formed during the synthesis cause reactions. One factor of the composition instability of the BRO is dissolution of the A site element, Bi. The formation of the by-products containing Bi during the BRO synthesis is a factor in degradation of the cycle characteristics. For this, PTL 4 discloses a method of applying the acid treatment to the synthesized BRO, but this method has two steps of synthesizing the BRO once and then further applying the treatment to it, which increases the number of steps to obtain the oxygen catalyst and changes the composition and the particle size of the BRO with this treatment.

Furthermore, at particle sizes larger than nanoparticle, physical-chemical properties in the inside (bulk) of and on the surface of the particle are different. However, in the case of the nanoparticle, such differentiation is difficult, making it difficult to obtain the stability of the bulk on the surface. The oxygen reaction occurs on the surface of the oxygen catalyst, and thus the nanoparticles of the oxygen catalyst are required to have composition stability and uniformity from the surface to the bulk, but there is no oxygen catalyst that meets such requirement, including the BRO.

There has been also a problem that, for the above reason, it is difficult for the electrode that uses the BRO as the oxygen catalyst to maintain high catalytic activity and stability for the oxygen reaction that occurs at the electrode, due to the problem of the BRO.

On the other hand, the oxygen catalyst is commonly evaluated by fixing the oxygen catalyst to the surface of a disk-shaped conductive substrate, mounting the conductive substrate on a rotating disk electrode device with the surface to which the oxygen catalyst is fixed downward, and while rotating the rotating disk electrode at a constant rate in a state where the oxygen catalyst is immersed in an electrolytic solution, recording the relationship between the potential and the current with an electrochemical measurement method referred to as cyclic voltammetry or linear sweep voltammetry. In this case, carbon is often used as a material of the conductive substrate. However, the oxygen reduction and the oxygen generation also occur on the surface of the carbon itself. As the current to be recorded, the current due to the reaction on the oxygen catalyst and the current due to the reaction on the carbon are superimposed, making it difficult to distinguish them. Thus, there is a problem that the activity of the oxygen catalyst alone cannot be evaluated at the electrode that uses carbon as the conductive substrate and supports the catalyst on its surface. In addition, in the conductive substrate that supports the oxygen catalyst, the oxygen catalyst is likely to drop because the surface on which the oxygen catalyst is supported faces down in the electrolytic solution. To avoid such drop, when fixing the oxygen catalyst onto the conductive substrate, a fixative such as resin particles or ionomer is usually applied together to fix it. However, such resin or ionomer inhibits the contact between hydroxide ions and molecular oxygen, which are reactants of the oxygen reaction, and the oxygen catalyst, or a part of the oxygen catalyst is coated with the resin or the ionomer, resulting in unutilized oxygen catalyst. Thus, there is a problem that it is impossible to exactly determine the weight and the surface area of the oxygen catalyst involved in the reaction actually, which are important in the activity evaluation of the oxygen catalyst.

Furthermore, there is a problem that there is no electrochemical measurement method that can evaluate the activity of the oxygen catalyst alone, due to the problem of the electrode in the catalytic activity evaluation as described above.

That is, in order to maintain the activity for the oxygen reaction as the oxygen catalyst, oxygen catalysts with better composition stability are desired. In addition, in order to solve the conventional problems of the oxygen catalyst such as the decrease in the composition stability and the decrease in long maintainability, it is necessary to keep the balance of charge of cations and anions throughout the oxide. Furthermore, it is desired smaller particle size, particularly smaller particle size at the nanoparticle level, to achieve higher catalytic activity per unit weight even with an identical composition.

It is also desired to provide an electrode that uses the oxygen catalyst, the electrode having high activity and stability for the oxygen reaction.

It is also desired to provide an electrochemical measurement method that can evaluate the catalytic activity of the oxygen catalyst alone.

This disclosure has been made in view of these circumstances, and its object is to provide an oxygen catalyst excellent in catalytic activity and composition stability in a system that uses an alkali aqueous solution as an electrolyte and to provide an electrode having high activity and stability using the oxygen catalyst, and an electrochemical measurement method that can evaluate the catalytic activity of the oxygen catalyst alone.

Solution to Problem

In order to solve the above problems, an oxygen catalyst of this disclosure has the following constitution. The oxygen catalyst of this disclosure is an oxygen catalyst that uses an alkali aqueous solution as an electrolyte, and the oxygen catalyst is characterized in being an oxide having peaks at positions of $2\theta=30.07°\pm1.00°$, $34.88°\pm1.00°$, $50.20°\pm1.00°$, and $59.65°\pm1.00°$ in an X-ray diffraction measurement using a CuK$\alpha$ ray and having constituent elements of bismuth, ruthenium, sodium, and oxygen, wherein an atom ratio O/Bi of oxygen to bismuth and an atom ratio O/Ru of oxygen to ruthenium are both more than 3.5. $2\theta$ in the X-ray diffraction measurement means a diffraction angle of the diffracted X-ray, and hereinafter, this diffraction angle is simply referred to as $2\theta$. Further, the "oxide having constituent elements of bismuth, ruthenium, sodium, and oxygen" in this specification does not exclude impurities that are inevitably generated during the production of the oxygen catalyst of this disclosure.

This constitution includes sodium as the constituent element, unlike the BRO having the pyrochlore structure, to first increase the stability of the composition in terms of the balance of charge. Simultaneously, the uniformity of the composition from the inside to the surface improves at the nanoparticles. In addition, by-products during the synthesis are decreased. Further, the improvement in composition stability decreases the composition change as caused by dissolution of Bi at the oxygen catalyst of this disclosure, unlike the BRO.

The oxide used as the oxygen catalyst in this disclosure (hereinafter, simply referred to as the oxygen catalyst) can be obtained, as described in Examples below, by preparing an aqueous solution in which respective metal salts of bismuth and ruthenium, for example, metal nitrate and metal chloride are dissolved, adding a sodium hydroxide aqueous solution to this mixed solution, precipitating metal hydroxide in the agitated and mixed solution, and calcining the precipitate at a predetermined temperature. In this case, the above mixed solution contains an introduction promoter and a stabilizer as described later, having an action to promote introduction of sodium ions into the metal hydroxide so that the metal hydroxide contains sodium ions in addition to bismuth ions and ruthenium ions, and to stabilize the precipitation of the metal hydroxide in such state at nano-size. The oxygen catalyst obtained by such method has diffraction peaks when $2\theta$ value is 14.82°, 30.07°, 34.88°, 38.17°, 45.88°, 50.20°, 59.65°, 62.61°, 73.80°, 81.68°, and 84.28° in the X-ray diffraction using the CuK$\alpha$ ray. However, any $2\theta$ values have a range of about ±1.00°. Among them, the diffraction peaks at 30.07°, 34.88°, 50.20°, and 59.65° occur with higher diffraction intensities compared with the others. That is, the oxygen catalyst of this disclosure uses an oxide that has a crystal structure in the above-described X-ray diffraction pattern and contains bismuth, ruthenium, sodium, and oxygen.

The oxygen catalyst of this disclosure can be obtained by the method of first depositing and precipitating the metal hydroxide in a solution and calcining the precipitate, as described above. In the case of such solution process, a sodium salt solution is added to a metallic salt solution to make the hydrogen ion exponent (hereinafter, referred to as pH) of the solution alkaline. In this case, the metallic salt solution is required to contain a component that acts on the introduction promotion of sodium into the metal hydroxide and the stabilization. That is, it is difficult to obtain a metal oxide that contains bismuth, ruthenium, and sodium, such as the oxygen catalyst of this disclosure, only by bismuth ions, ruthenium ions, and sodium ions existing in the solution and by making the pH of the solution alkaline. For example, in the absence of the sodium introduction promoter and stabilizer as described above, even if the BRO can be obtained, it is difficult to obtain the oxygen catalyst of this disclosure that contains sodium in addition to bismuth, ruthenium, and oxygen as the constituent elements and has a structure different from the pyrochlore structure.

Even if the material obtained under the conditions without the sodium introduction promoter and stabilizer is the BRO from the result of the diffraction peak by the X-ray diffraction method normally used for crystal structure analysis, and the result exhibiting sodium in addition to bismuth and ruthenium is obtained from the analysis result by the energy dispersive X-ray analysis method normally used for the analysis of the type and composition of elements, this does not mean that the BRO contains sodium. The reason is that, in the case of the conditions without the sodium introduction promoter and stabilizer, an oxide that contains sodium such as $BiNaO_3$ is generated as a by-product. In the measurement by the X-ray diffraction method, if the amount of such by-product is proportionally small, the diffraction peak is not indicated. On the other hand, the energy dispersive X-ray analysis method can detect elements at a higher sensitivity than the X-ray diffraction method and detect all elements existing in an object even in the case of a small amount of by-product, in which the peak does not occur in the X-ray diffraction method, thus obtaining the result that sodium is detected in addition to bismuth and ruthenium when the BRO and $BiNaO_3$ are mixed. However, they are different compounds, not one compound. Therefore, what elements are contained in the crystal structure of a certain oxide only becomes evident after analyzing the crystal structure in finer area, for example, becomes clear by the X-ray absorption fine structure analysis (XAFS) as described later. Even in the conditions with the sodium introduction promoter and stabilizer, when the mixing and agitation of the metallic salt solution are insufficient or when the amount of the metallic salt solution is large and the time for mixing and agitation is short in relation to the amount of the solution, the oxide that has the crystal structure in the X-ray diffraction pattern and contains bismuth, ruthenium, sodium, and oxygen, such as the above-described oxygen catalyst of this disclosure, may not be obtained.

The temperature for calcining the metal hydroxide varies according to conditions other than the temperature for calcination, such as a type of solvent used for the solution when causing the precipitation of the metal hydroxide, a type of the metal salt to be used and its concentration in the solution, a method of drying the precipitated metal hydroxide, and its conditions. For example, in the method using the aqueous solution as described above, the case in which the calcination temperature is lower than 300° C. is usually unpreferable because the structural change from the hydroxide state to the oxide is unlikely to occur sufficiently. The case in which the calcination temperature exceeds 800° C. is unpreferable because the oxide may decompose. In the case of Examples described later, the range of 450° C. to 650° C. is preferable, and the range of 550° C. to 600° C. is more preferable. However, the method of producing the oxygen catalyst of this disclosure is not limited to only the above method. Various production methods can be used, such as methods called a sol-gel method and a hydrothermal synthesis method, and a method of preliminarily preparing a bismuth oxide, a ruthenium oxide, and a sodium oxide and adding mechanical, thermal, and electrical energies to the prepared one to produce an oxide by solid-phase reaction or semisolid-phase reaction.

Here, the sodium salt solution in the above method includes, but is not limited to, the sodium hydroxide aqueous solution as a typical example. However, it is necessary to be able to make the pH alkaline so as to cause the precipitation of the metal hydroxide, and it is desirable that the anion of the sodium salt does not inhibit the introduction of sodium ions into the metal hydroxide and the stabilization.

The oxygen catalyst of this disclosure has the aforementioned crystal structure indicated by the X-ray diffraction pattern. As described later, when explained with reference to a theoretical pyrochlore structure indicated by $A_2B_2O_7$, the position of bismuth in this crystal structure is equivalent to the vicinity of the A site position, the position of ruthenium is almost equivalent to the B site position in the identical structure, and the position of sodium is equivalent to the position in the vicinity of the A site or in the vicinity of the B site. The catalyst of this disclosure has a structure that is similar to the pyrochlore structure but different. Thus, when explaining here the meaning of "the vicinity of site" using the pyrochlore structure indicated by $A_2B_2O_7$ here, it means the position out of the site centers of the A site and the B site. The position of sodium is described to be in the vicinity of the A site or in the vicinity of the B site, but, as described later, sodium is likely to exist in the vicinity of the A site. In the crystal structure, sodium, bismuth, and ruthenium are all cations, which are +1 valence, +3 valence, and +4 valence, respectively, as described later. It is considered that an oxide ion (−2 valence), which is an anion, and a bismuth ion, a ruthenium ion, and a sodium ion, which are cations, balance the overall charge of the oxide, which improves the composition stability and the long maintainability compared with the BRO and improves the uniformity at nanoparticles. Here, "the charge being balanced" in the metal oxide normally means that the total charge number of the cation and the total charge number of the anion are identical. If these numbers differ significantly, this is a factor that decreases the composition stability, the long maintainability, or the uniformity as described above. That is, the oxygen catalyst of this disclosure contains sodium ions in addition to bismuth ions, ruthenium ions, and oxide ions and has good balance of charge, which is considered to contribute to the generation of properties that are significantly different from those of the BRO.

The balance of charge in the oxygen catalyst of this disclosure is further explained. First, as described above, the oxide of the pyrochlore structure is represented by the general atom ratio $A_2B_2O_7$. Here, when an atom ratio of oxygen to the A site element is O/A and an atom ratio of oxygen to the B site element is O/B, these atom ratios are both 3.5. On the other hand, considering the aforementioned oxygen deficient type BRO similarly, the atom ratio O/Ru of oxygen to Ru is less than 3.5.

However, in the oxygen catalyst of this disclosure, the atom ratio O/Bi and the atom ratio O/Ru are both more than 3.5. In the oxygen catalyst of this disclosure, the atom ratio O/Bi and the atom ratio O/Ru are both preferably 4 or less. This simply means that there are more anions, oxide ions (ionic formula: $O^{2-}$) and proportionally fewer cations in the balance of charge, relative to the composition ratio of the general pyrochlore structure. However, the oxygen catalyst of this disclosure contains not only bismuth and ruthenium but also sodium. That is, the charge is balanced between these three metal ions and the oxide ions. As described in Examples below, the total charge number of the cations of these three metals and the total charge number of the only anion, the oxide ion are almost identical. That is, when (total charge number of anions)/(total charge number of cations) is defined as a total charge ratio, the oxygen catalyst of this disclosure has a total charge ratio of 0.9 or more and 1.1 or less. Here, when the atom ratios of four elements: bismuth, ruthenium, sodium, and oxygen, which are contained in the oxygen catalyst of this disclosure, are K, L, M, and N, respectively, the total charge number of the anions is 2N, the total charge number of the cations is a value represented by (3K+4L+M), and the total charge ratio is represented by 2N/(3K+4L+M).

Furthermore, the reason that including sodium ions in the crystal structure in addition to bismuth ions and ruthenium ions, in the oxygen catalyst of this disclosure has an action to improve the composition stability and the long maintainability compared with the BRO and improve the uniformity at nanoparticles is explained from the coordination number and the ionic radius of the cation.

In the pyrochlore structure such as the BRO, the coordination number of the cation of the A site is 8. Here, the coordination number of the cation being 8 means that this cation is surrounded by eight nearest neighbor anions. The coordination number of the cation of the B site is 6. Normally, the radius of the ion in the solid crystal differs depending on the type of the element, the oxidation number, and the coordination number, and such data is publicly available in various books, data books, etc. As one example, for the bismuth ion, even having identical +3 valence, the ionic radius is 0.96 Å when the coordination number is 5, 1.03 Å when the coordination number is 6, and 1.17 Å when the coordination number is 8. The bismuth ion in the BRO is +3 valence, and it is at the A site. Thus, as described above, the coordination number is 8, and the ionic radius is 1.17 Å. The ruthenium ion is +4 valence, and it is at the B site. Thus, the coordination number is 6, and the ionic radius is 0.62 Å. On the other hand, the valence of the sodium ion is only +1 valence, but the ionic radius is 0.99 Å when the coordination number is 4, 1.00 Å when the coordination number is 5, 1.02 Å when the coordination number is 6, 1.12 Å when the coordination number is 7, 1.18 Å when the coordination number is 8, 1.24 Å when the coordination number is 9, and 1.39 Å when the coordination number is 12, and it is possible to take various coordination numbers from 4 to 12. Here, the difference between the ionic radius (1.18 Å) when the coordination number of the sodium ion is 8 and the ionic radius (1.17 Å) when the coordination number of the bismuth ion is 8 is 1% or less. Therefore, if only the ionic radius is considered, it is predicted that the sodium ion can enter the position of the bismuth ion in the BRO. However, the sodium ion is +1 valence, and the bismuth ion is +3 valence. Thus, it is inferred to be difficult to make a structure in which a part of the bismuth ions is simply replaced with the sodium ions while maintaining the pyrochlore structure. That is, the oxygen catalyst of this disclosure has not a pyrochlore structure in which a part of the bismuth ions in the BRO is simply replaced with the sodium ions, but a structure that is similar to the pyrochlore structure but different. Thus, the sodium ion contributes to the stabilization of the oxide to be obtained, structurally and in the balance of charge, in the formation of the structure similar to that of pyrochlore.

Furthermore, it is important that the constituent elements of the oxygen catalyst of this disclosure are sodium in addition to bismuth, ruthenium, and oxygen. When using elements other than sodium, which are classified into alkali metal elements, it is difficult to obtain an oxygen catalyst having a structure similar to the pyrochlore structure, such as the oxygen catalyst of this disclosure. This is described in Comparative Examples below, but the reason that it is difficult with the other alkali metal elements can be also understood from the ionic radius. For example, as alkali metal elements, lithium is +1 valence and has an ionic radius of 0.92 Å when the coordination number is 8, potassium is +1 valence and has an ionic radius of 1.51 Å when the coordination number is 8, rubidium is +1 valence and has an ionic radius of 1.61 Å when the coordination number is 8, and cesium is +1 valence and has an ionic radius of 1.74 Å when the coordination number is 8. That is, structurally, when the coordination number is 8, only the sodium ion is close in ionic radius to the +3 valence bismuth ion. The ionic radius of the lithium ion is smaller than that of the +3 valence bismuth ion by 20% or more, and the ionic radiuses of the other +1 valence cations are larger than that of the +3 valence bismuth ion by 29% or more, and thus it is inferred to be very difficult to have a stable crystal structure.

The oxygen catalyst of this disclosure is characterized in that an atom ratio Na/Ru of sodium to ruthenium is 0.285±0.015. The atom ratio Na/Ru having this range of value has an action to be able to suppress structural distortion that occurs by including the bismuth ion and the sodium ion, which is close in ionic radius to the bismuth ion, together in the crystal structure similar to that of pyrochlore. The atom ratio Na/Ru is preferably 0.286±0.013 and more preferably 0.275 to 0.297.

The oxygen catalyst of this disclosure is characterized in that an atom ratio (Bi+Na)/Ru (referred to as a cation atom ratio) of the sum of bismuth and sodium to ruthenium is 1.285±0.010. This has an action to be able to more suppress the above structural distortion. Furthermore, the oxygen catalyst of this disclosure is characterized in that a ratio (3Bi+Na)/4Ru (referred to as a cation charge ratio) of the sum (3Bi+Na) of the total charge number of bismuth and the total charge number of sodium to the total charge number of ruthenium 4Ru is 0.820±0.020. This has an action to make the balance between the total charge number of the cation and the total charge number of the anion closer to 1 to more improve the structural stability in terms of the balance of charge in the overall crystal structure. The cation charge ratio (3Bi+Na)/4Ru is preferably 0.821±0.015 and more preferably 0.810 to 0.833.

The electrode of this disclosure is characterized in using the oxygen catalyst of this disclosure. The electrode of this disclosure is also characterized in that the oxygen catalyst of this disclosure is supported on titanium. Titanium has very small current in the reduction of oxygen and the generation of oxygen. Thus, titanium can support the oxygen catalyst without the current being superimposed on the reaction current of oxygen in the oxygen catalyst and without the fixative. Furthermore, the electrode of this disclosure is characterized in that the oxygen catalyst of this disclosure is supported on the bottom surface of the titanium that is cylindrically formed. Moreover, this disclosure is an electrochemical measurement method using a rotating disk electrode method, the electrochemical measurement method being characterized in using an electrode that causes titanium to support the oxygen catalyst of this disclosure, as a rotating disk electrode.

In addition, the electrode of this disclosure is characterized in being any of the air electrodes of an air primary battery and an air secondary battery, the oxygen cathode of brine electrolysis, the cathode of an alkaline fuel cell, or the anode of alkaline water electrolysis, which uses an alkali aqueous solution as an electrolyte, and using the oxygen catalyst of this disclosure.

Advantageous Effect

The oxygen catalyst of this disclosure provides the following effects by including sodium as a constituent element, unlike the BRO having the pyrochlore structure. First, the stability of the composition in terms of the balance of charge increases. The long maintainability also improves. Particularly, the uniformity of the composition from the inside to the surface also improves also when making the oxygen catalyst into nanoparticles. Furthermore, the formation of the by-products during the synthesis is suppressed. Together, high catalytic activity for the reduction of oxygen and/or the generation of oxygen can be provided.

The composition stability, its long maintainability, and the composition uniformity improve, and the formation of the by-products is suppressed. Thus, high catalytic activity and stability for the oxygen reduction and/or the oxygen generation can be simultaneously provided to an electrode that uses this catalyst as a catalyst for the oxygen reduction and/or the oxygen generation using an alkali aqueous solution as the electrolyte. This decreases reaction overpotential at the air electrode of the air battery, the oxygen cathode of the brine electrolysis, the cathode of the alkaline fuel cell, and the anode of the alkaline water electrolysis. The discharge voltage of the air primary battery increases. The discharge voltage of the air secondary battery increases, and the charge voltage of the air secondary battery decreases. The electrolysis voltage at the brine electrolysis decreases. The voltage of the alkaline fuel cell increases. The electrolysis voltage at the alkaline water electrolysis decreases. Then, these are maintained.

The increase in discharge voltage at the air primary battery improves the energy density and the power density of the air battery. The increase in discharge voltage and the decrease in charge voltage at the air secondary battery improve the energy density, the power density, the voltage efficiency, and the energy efficiency. These are also maintained.

The decrease in electrolysis voltage at the brine electrolysis can decrease the electric power intensity and the electric energy intensity of chlorine and caustic soda to be produced to reduce the electric cost in the production. The increase in voltage at the alkaline fuel cell improves the energy density and the power density. The decrease in electrolysis voltage at the alkaline water electrolysis can decrease the electric power intensity and the electric energy intensity of hydrogen to be produced to reduce the electric cost in the production.

Furthermore, the oxygen catalyst of this disclosure eliminates the need for the post-process as disclosed in PTL 4, such as the acid treatment to remove the by-products from the synthesized material obtained after the BRO synthesis. This can more reduce the production cost of the air primary battery and the air secondary battery, the production cost of chlorine and caustic soda produced by the brine electrolysis, the production cost of the alkaline fuel cell, and the production cost of hydrogen for the alkaline water electrolysis, with respect to the air electrode of the air battery, the oxygen cathode of the brine electrolysis, the cathode of the fuel cell, or the anode of the alkaline water electrolysis, which uses the BRO catalyst. The price of sodium is $1/1000$ or less of those of bismuth and ruthenium, which can significantly reduce the raw material cost with respect to the BRO.

Furthermore, the electrode of this disclosure can provide an electrode suitable for the use in the rotating disk electrode, by the oxygen catalyst of this disclosure being supported on titanium or the bottom surface of cylindrically formed titanium. An electrode in which the oxygen catalyst is supported without the fixative can also be provided. An oxygen catalyst support electrode can also be provided as a standard for comparison in the development of the oxygen catalyst. Furthermore, the electrode of this disclosure can provide any of the air electrodes of the air primary battery and the air secondary battery, the oxygen cathode of the brine electrolysis, the cathode of the alkaline fuel cell, and the anode of the alkaline water electrolysis, which have high catalytic activity and stability as described above, are low cost, and use the alkali aqueous solution as the electrolyte.

The electrochemical measurement method of this disclosure does not cause the oxygen reduction and the oxygen generation on the conductive substrate, which are problems in the conventional methods, in the activity evaluation of the oxygen catalyst. Therefore, the current to be recorded is only the reaction current on the oxygen catalyst. No fixative such as resin particles and ionomer is used when fixing the oxygen catalyst onto the conductive substrate. Thus, the fixative does not inhibit contact between hydroxide ions and molecular oxygen, which are reactants of the oxygen reaction, and the oxygen catalyst and coat a part of the oxygen catalyst with resin or ionomer, resulting in unutilized oxygen catalyst. Therefore, this does not cause inconvenience of not being able to exactly determine the surface area and the weight of the oxygen catalyst involved in the reaction, which are important in the activity evaluation of the oxygen catalyst. Therefore, the Tafel slope and the exchange current density, which are evaluation indexes of the catalytic activity, can be exactly determined.

DETAILED DESCRIPTION

The following specifically describes embodiments of this disclosure using examples, but this disclosure is not limited to these embodiments and examples.

Example 1

In the following procedure, an oxide to be used as an oxygen catalyst of Example 1 (hereinafter, may be simply referred to as the oxygen catalyst) was synthesized. First, tetra-n-propylammonium bromide (abbreviation: TPAB, purity: 98.0%) was dissolved in distilled water in a beaker, and then added to distilled water at 75° C. with a hot stirrer. The concentration was set to about $9.0 \times 10^{-1}$ mol/L. In the following, this solution is a TPAB solution. TPAB has a role of the aforementioned introduction promoter and stabilizer.

Next, ruthenium(III) chloride-n-hydrate (Ru content rate: 43.25%) and bismuth(III) nitrate pentahydrate (purity: 99.5%) were weighed, and each was dissolved in distilled water. The concentrations of these solutions were both about $1.8 \times 10^{-1}$ mol/L. The solution of bismuth(III) nitrate pentahydrate was subjected to ultrasonic agitation for about 5 minutes. Hereinafter, the respective solutions were referred to as a Ru solution and a Bi solution.

Next, the TPAB solution, the Ru solution, the Bi solution, and distilled water were mixed at 75° C. with predetermined amounts to prepare a metallic salt solution with the total amount of 500 mL. The Ru concentration and the Bi concentration in this metallic salt solution were both $7.44 \times 10^{-3}$ mol/L, and the TPAB concentration was $3.72 \times 10^{-2}$ mol/L. After this metallic salt solution was agitated and mixed at 75° C. for 1 hour, a separately prepared 2 mol/L NaOH (sodium hydroxide) aqueous solution of 60 mL was added. After this, with keeping the temperature at 75° C., this solution was subjected to agitation for 24 hours while blowing oxygen at 50 mL/min (while oxygen bubbling).

After the end of the agitation, this solution was allowed to stand for another 24 hours to obtain a precipitate. This precipitate was taken out and evaporated to dryness for about 2 hours in an electric furnace at 105° C. The thus obtained dried solid material was transferred to an evaporating dish and then dried in the electric furnace at 120° C. for 3 hours. The material after drying was ground in a Menor mortar and then held and calcined in the electric furnace at 600° C. for 1 hour. The material obtained after the calcination was filtered by suction using distilled water at 75° C., an aspirator, and a paper filter. The material on the paper filter was collected and then dried in the electric furnace at 120° C. for 3 hours. Thus, the oxygen catalyst (oxide) of Example 1 was obtained.

In the above operation, the relationship between the Ru concentration, the Bi concentration, and the TPAB concentration is important. TPAB has a role as the introduction promoter and stabilizer for sodium, but too much or too little TPAB relative to the Ru and Bi concentrations is unpreferable. Too much TPAB is unpreferable because the introduction of sodium into the metal hydroxide is inhibited. On the other hand, too little TPAB is unpreferable because the stabilization of the metal hydroxide containing sodium is insufficient and the particle size of the oxygen catalyst to be obtained increases, making it difficult to obtain the oxygen catalyst at nano-level. In the oxygen catalyst of Example 1, the TPAB concentration is 5 times higher than the Ru concentration. For example, if the TPAB concentration is 1 time, TPAB is insufficient, and if the TPAB concentration exceeds 20 times, TPAB is excess. Both cases are unpreferable because TPAB cannot function as the introduction promoter and stabilizer. Such introduction promoter and stabilizer are not limited to TPAB, and other materials can also be used.

Example 2

An oxygen catalyst of Example 2 was similarly obtained, except that the TPAB solution, the Ru solution, the Bi solution, and distilled water were mixed at 75° C. with predetermined amounts and the Bi concentration in the metallic salt solution with the total amount of 500 mL was changed from $7.44 \times 10^{-3}$ mol/L to $6.96 \times 10^{-3}$ mol/L, in the synthesis of the oxygen catalyst of Example 1.

Comparative Example 1

An oxide of Comparative Example 1 was similarly obtained, except that the NaOH aqueous solution was changed to a LiOH (lithium hydroxide) aqueous solution, in the synthesis of the oxygen catalyst of Example 1.

Comparative Example 2

Comparative Example 2 is similar to Example 1, except that the following acid treatment is additionally applied to the oxygen catalyst of Example 1. The oxygen catalyst of Example 1 of 0.145 g and 0.1 mol/L nitric acid solution of 12 mL were put into a container and subjected to ultrasonic agitation for 30 minutes, and after the ultrasonic agitation, the agitated solution was allowed to stand for 1 hour (acid treatment). After this, the supernatant fluid was removed, distilled water of 12 mL was added for cleaning, the ultrasonic agitation was performed for 30 minutes, and then, the agitated solution was allowed to stand for 1 hour. Subsequently, the supernatant fluid was removed, the same amount of distilled water was added again for further cleaning, the ultrasonic agitation was performed for the same period, and then, the agitated solution was filtered by suction using distilled water until the pH of filtrate became 7. The preceding operation was performed at the room temperature. After this, the material on the paper filter was taken out and then dried at 120° C. for 3 hours, obtaining an oxide of Comparative Example 2.

(X-Ray Diffraction Measurement)

Figure 1:
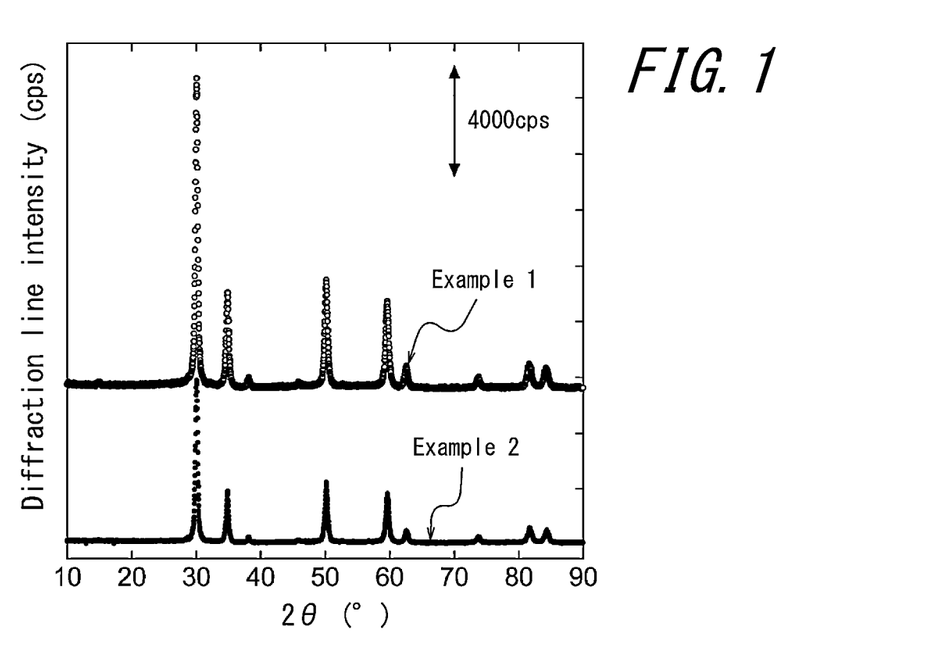
FIG. 1 is a result of the X-ray diffraction measurement for oxygen catalysts of Example 1 and Example 2.

The oxygen catalysts of Example 1 and Example 2 and the oxides of Comparative Example 1 and Comparative Example 2 were analyzed by an X-ray diffractometer (made by Rigaku, Ultima IV) using CuKα ray (wavelength: 1.54 Å). Measurement conditions included a voltage of 40 kV, a current of 40 mA, a range of a diffraction angle 2θ (hereinafter, may be simply referred to as 2θ) of 10 to 90°, and a step angle of 0.020°. FIG. 1 and Table 1 illustrated the results of Example 1 and Example 2, FIG. 2 illustrated the result of Comparative Example 1, and FIG. 3 illustrated the comparison of the results of Example 1 and Comparative Example 2.

As illustrated in FIG. 1 and Table 1, the oxygen catalysts of Example 1 and Example 2 were found to be oxides that have diffraction peaks when the mean value of 2θ values (2θ mean value) is 14.82°, 30.07°, 34.88°, 38.17°, 45.88°, 50.20°, 59.65°, 62.61°, 73.80°, 81.68°, and 84.28° by the X-ray diffraction measurement using the CuKα ray. The 2θ mean value in Table 1 is presented by synthesizing a plurality of oxides for each of Example 1 and Example 2, determining respective 2θ values for all of them, calculating respective mean values of 2θ values for Example 1 and Example 2, and obtaining the mean value of these two mean values. That is, the 2θ mean value in Table 1 is the mean value of Example 1 and Example 2.

In both of the oxygen catalyst of Example 1 and the oxygen catalyst of Example 2, the diffraction peaks when the 2θ mean value is 30.07°, 34.88°, 50.20°, and 59.65° occur with higher diffraction intensity compared with those of the other values among the above 2θ values. This is characteristic of the oxygen catalyst according to this embodiment. Theoretically, the diffraction intensity in the X-ray diffraction measurement tends to become significantly weaker as the particle size of an object decreases, particularly, to the nano-level. Therefore, the above characteristic 2θ values characterize the oxygen catalyst according to this embodiment even if it is a particle having several tens of nanometers, as described later. The result in FIG. 1 had no diffraction peak that indicates the presence of by-products other than the oxygen catalyst according to this embodiment.

Figure 2:
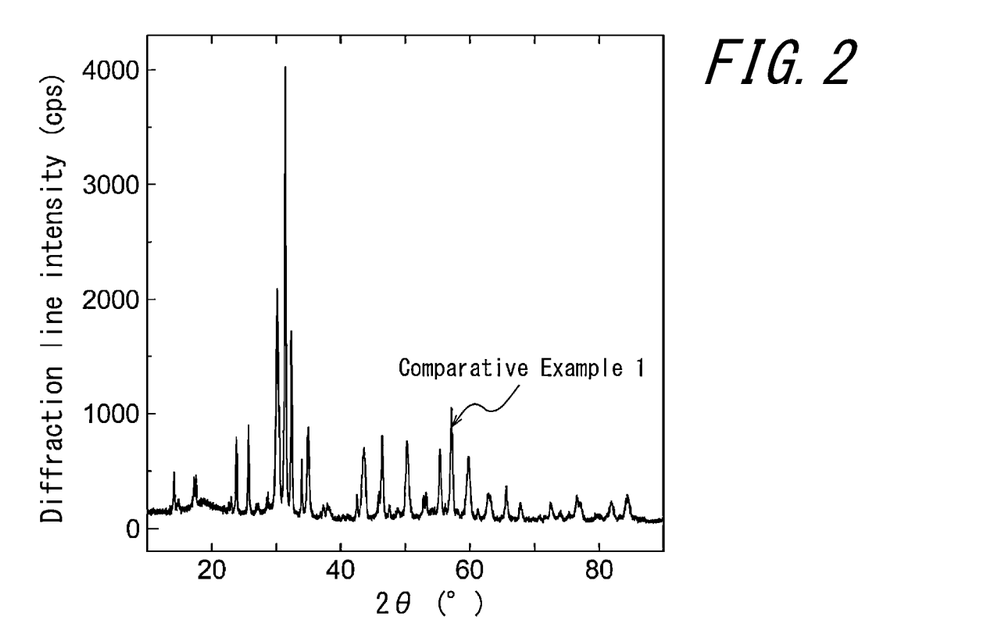
FIG. 2 is a result of the X-ray diffraction measurement for an oxide of Comparative Example 1.
Figure 3:
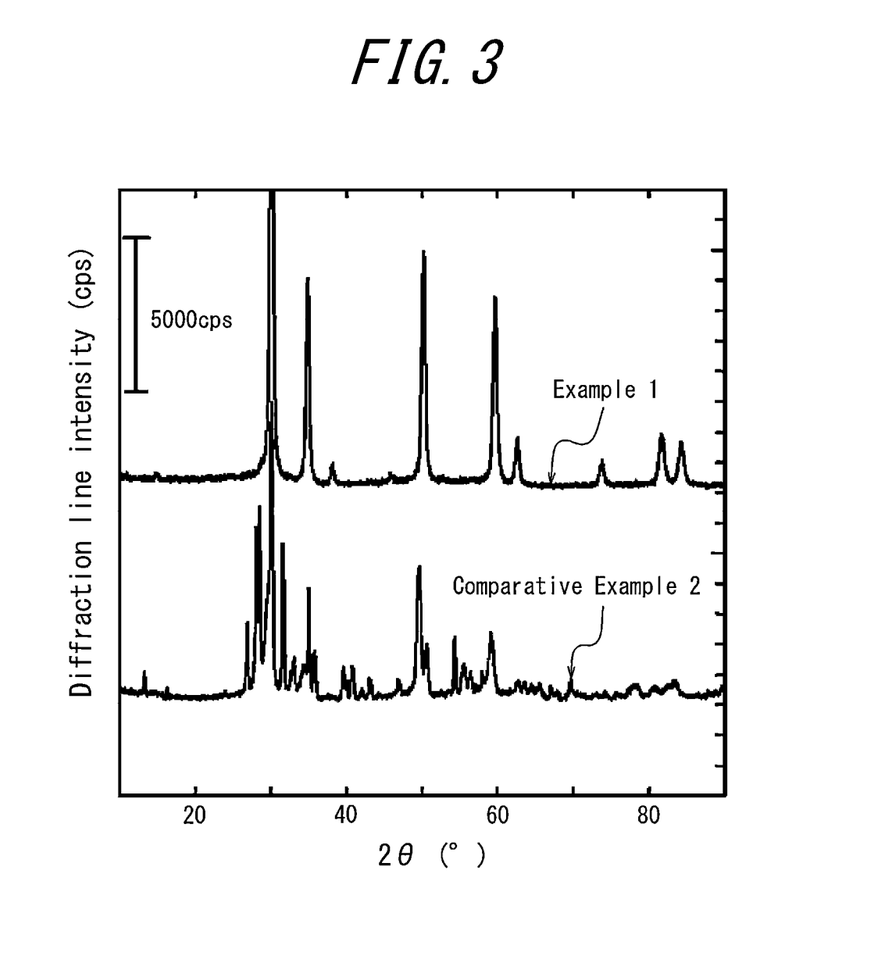
FIG. 3 is a result of the X-ray diffraction measurement for the oxygen catalyst of Example 1 and an oxide of Comparative Example 2.

Next, as illustrated in FIG. 2, the result of Comparative Example 1 detected diffraction lines (diffraction peaks) at numerous 2θ values, which were different from the diffraction peaks of the oxygen catalysts of Example 1 and Example 2. This detection result found that the oxide of Comparative Example 1 was a compound having a structure different from that of the oxygen catalyst according to this embodiment. That is, it was found that the oxygen catalyst according to this embodiment could not be obtained when replacing the sodium hydroxide aqueous solution of Example 1 with the lithium hydroxide aqueous solution of Comparative Example 1. It was also suggested that the oxygen catalyst according to this embodiment included sodium in the crystal structure.

Furthermore, as illustrated in FIG. 3, the result of Comparative Example 2 detected diffraction lines at obviously different and numerous 2θ values, compared with the result of Example 1. This detection result found that the crystal structure of the oxygen catalyst obtained in Example 1 had changed to a different crystal structure by the acid treatment. That is, it was found that the acid treatment as described in PTL 4 had no effect of removing impurities on the oxygen catalyst according to this embodiment and rather had an influence of changing the structure of the oxygen catalyst according to this embodiment. Such difference also found that the oxygen catalyst according to this embodiment is a compound different from the BRO disclosed in a plurality of documents including PTL 4.

TABLE 1

| Example 1 2θ (°) | Example 2 2θ (°) | 2θ mean value (°) |
|---|---|---|
| 14.79 | 14.85 | 14.82 |
| 30.06 | 30.09 | 30.07 |
| 34.85 | 34.91 | 34.88 |
| 38.17 | 38.18 | 38.17 |
| 45.88 | 45.88 | 45.88 |
| 50.18 | 50.23 | 50.20 |

TABLE 1-continued

| Example 1 2θ (°) | Example 2 2θ (°) | 2θ mean value (°) |
|---|---|---|
| 59.62 | 59.68 | 59.65 |
| 62.58 | 62.64 | 62.61 |
| 73.70 | 73.90 | 73.80 |
| 81.64 | 81.72 | 81.68 |
| 84.23 | 84.34 | 84.28 |

(Particle Observation)

Figure 4:
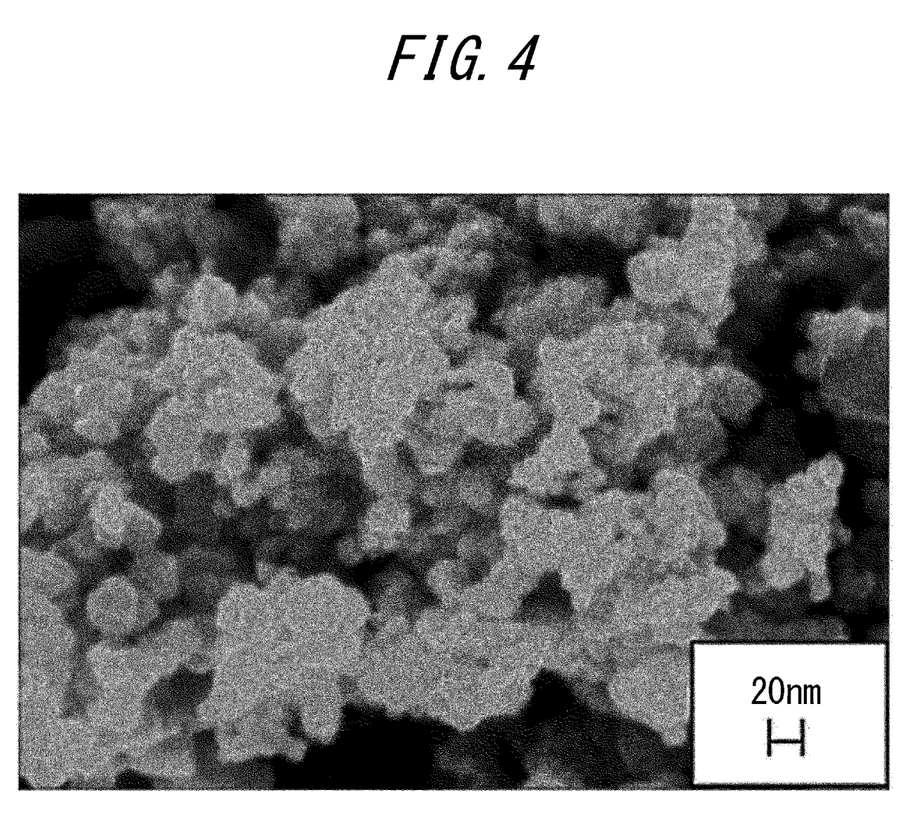
FIG. 4 is a SEM image illustrating a surface aspect of the oxygen catalyst of Example 1.
Figure 5:
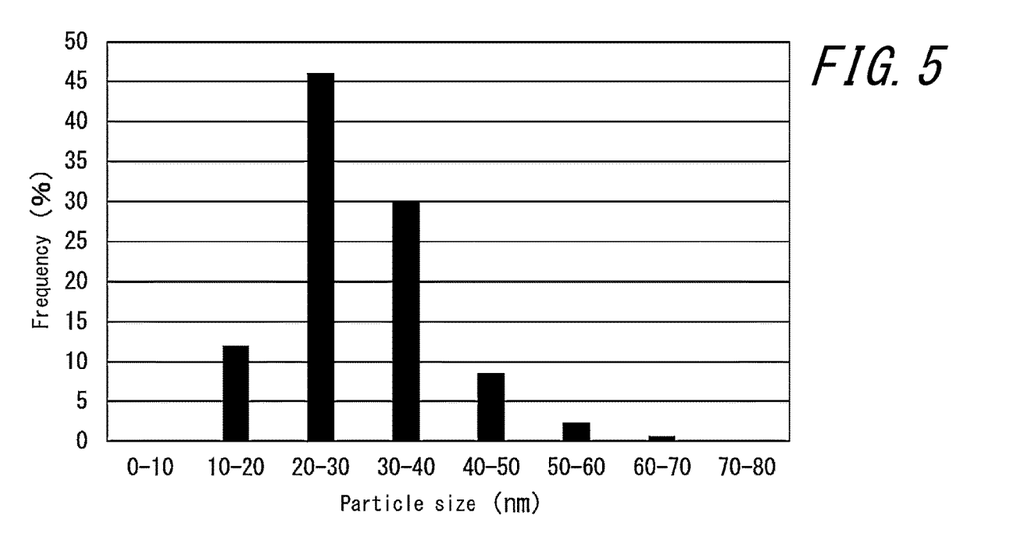
FIG. 5 is a relationship diagram between the primary particle size and the frequency of the oxygen catalyst of Example 1.

For the particle size of the oxygen catalyst according to this embodiment, as one example, the oxygen catalyst of Example 1 was observed by a scanning electron microscope (abbreviation: SEM, made by ZEISS, ULTRA 55), the long diameter of each particle was determined from the SEM image by image processing, this long diameter was defined as a primary particle size of the oxygen catalyst of Example 1 to obtain the frequency distribution. FIG. 4 illustrates a SEM image with which the particle size was observed. FIG. 5 illustrates the frequency distribution analysis result of the particle size obtained from such SEM image. The analysis of the frequency distribution was conducted for at least 250 or more particles. Thus, the oxygen catalyst of Example 1 was obtained as nanoparticles having a particle size distribution being across the range of 10 to 70 nm as a whole and having higher frequencies at 20 to 30 nm. Similar observation and particle size analysis were conducted for Example 2, the result was almost identical to that of Example 1.

(Energy Dispersive X-Ray Elemental Analysis (Abbreviation: EDX))

An energy dispersive X-ray elemental analyzer (made by AMETEK, Genesis APEX2) attached to the aforementioned scanning electron microscope device obtained atom ratios of sodium, bismuth, and ruthenium for the oxygen catalysts of Example 1 and Example 2. In this case, the acceleration voltage was set to 15 kV, and the cumulative time was set to 500 seconds, the maximum time that could be set on the device.

(Rutherford Backscattering Spectroscopy (Abbreviation: RBS))

Rutherford backscattering spectroscopy equipment (made by National Electrostatics, Pelletron 3SDH) obtained atom ratios of bismuth, ruthenium, and oxygen for the oxygen catalysts of Example 1 and Example 2. In this case, bismuth and ruthenium were analyzed from the measurement result using He ions as incident ions, and oxygen was analyzed from the measurement result using H ions. Based on these analysis results, each of an atom ratio Ru/Bi of ruthenium to bismuth, an atom ratio O/Bi of oxygen to bismuth, and an atom ratio O/Ru of oxygen to ruthenium was obtained. Among them, Table 2 presented the atom ratio O/Bi and the atom ratio O/Ru.

(Analysis of Atom Ratio of Four Elements)

When obtaining the atom ratio of four elements: bismuth (Bi), ruthenium (Ru), sodium (Na), and oxygen (O) from the results of the aforementioned EDX and RBS, bismuth, ruthenium, sodium, and oxygen as atoms may be referred to as Bi, Ru, Na, and O, respectively, in the following.

Here, the atom ratio of O is given as a value with respect to Bi in the result of the RBS, and the atom ratio of Na is given as a value with respect to Bi in the result of the EDX. On the other hand, the atom ratios of Bi and Ru are given from each of the EDX and the RBS. Thus, there are two ways to obtain the atom ratio of the four elements, depending on whether the result of the EDX or the RBS is used, for Bi and Ru atoms. Therefore, Table 3 presented the respective results of the atom ratios calculated by these two ways. In the atom ratio of Bi, Ru, Na, and O (atom ratio of four elements) in Table 3, the case using the result of the EDX for the atom ratios of Bi and Ru was indicated as EDX, and the case using the result of the RBS for the atom ratios of Bi and Ru was indicated as RBS. Table 4 presented the total charge ratio calculated using these values, the atom ratio Na/Ru, the cation atom ratio, and the cation charge ratio. This disclosure evaluates the oxygen catalysts based on the result in Table 2, as well as the results of the RBS in Table 3 and Table 4. That is, the oxygen catalysts are evaluated based on the atom ratios each obtained in the RBS in Table 2 to Table 4, and the results of the EDX in Table 3 and Table 4 are treated as references.

TABLE 2

|  | Atom ratio O/Bi | Atom ratio O/Ru |
|---|---|---|
| Example 1 | 3.57 | 3.63 |
| Example 2 | 3.60 | 3.54 |

TABLE 3

|  |  | Bi:Ru:Na:O (atom ratio of four elements) |
|---|---|---|
| Example 1 | EDX | 17.26:16.41:4.68:61.64 |
|  | RBS | 17.17:16.87:4.65:61.31 |
| Example 2 | EDX | 16.90:17.14:5.09:60.87 |
|  | RBS | 16.89:17.18:5.09:60.84 |

TABLE 4

|  |  | Total charge ratio | Atom ratio Na/Ru | Cation atom ratio | Cation charge ratio |
|---|---|---|---|---|---|
| Example 1 | EDX | 1.01 | 0.285 | 1.34 | 0.860 |
|  | RBS | 0.992 | 0.276 | 1.29 | 0.832 |
| Example 2 | EDX | 0.979 | 0.297 | 1.28 | 0.814 |
|  | RBS | 0.978 | 0.296 | 1.28 | 0.811 |

(X-Ray Absorption Fine Structure Analysis)

For the oxygen catalyst of Example 1, an X-ray absorption fine structure (XAFS) spectrum was measured, and information on chemical states of bismuth and ruthenium was obtained from the absorption near edge structure (X-ray Absorption Near Edge Structure (abbreviation: XANES)) in this spectrum. The measurement used equipment of High Energy Accelerator Research Organization (BL12C, NW10A) and Aichi Synchrotron Radiation Center (BL1N2). The result found that the valence was +3 from the analysis result of the XANES spectrum at the L3 edge of Bi and that the valence was +4 from the analysis result of the XANES spectrum at the K edge of Ru. The valence of the cation of Na is only +1 valence. The total charge ratio and the cation charge ratio in Table 4 were calculated using the valences of the above respective elements and the atom ratio of the four elements presented in Table 3.

Next, information on local structure of the oxygen catalyst was obtained from the Extended X-ray Absorption Fine Structure (trivial name: EXAFS) that appeared on the side of high energy of about 100 eV or more, with respect to the absorption edge. First, as a result of comparing a FT-EXAFS spectrum obtained from the EXAFS spectrum at the L3 edge of Bi (which is equivalent to a radial distribution function and indicates the atomic distance in the crystal structure) with a FT-EXAFS spectrum obtained theoretically assuming that Bi occupied the A site in the $A_2B_2O_7$ structure (hereinafter, the theoretically obtained FT-EXAFS spectrum is abbreviated to the theoretical spectrum), the measurement spectrum had a peak intensity smaller than that of the theoretical spectrum. The reason that the peak intensity of the measurement spectrum is thus smaller than that of the theoretical spectrum is the actual structure is different or there is a difference in atomic distance, with respect to a crystal structure assumed when obtaining the theoretical spectrum, that is, the $A_2B_2O_7$ structure, resulting in distortion. On the other hand, with respect to a peak originating from the first nearest neighbor Bi—O component of 1.6 to 2.2 Å in the theoretical spectrum, the measurement spectrum had a peak equivalent to the first nearest neighbor Bi—O component at 1.2 to 2.0 Å. These results found that, in the oxygen catalyst of Example 1, Bi existed in the vicinity of the A site when assuming the $A_2B_2O_7$ structure, but at the position away from the center of this site.

Similarly, as a result of comparing a FT-EXAFS spectrum at the K edge of Ru with a FT-EXAFS spectrum obtained theoretically assuming that Ru occupied the B site in the $A_2B_2O_7$ structure, the measurement spectrum and the theoretical spectrum had almost identical intensities. The theoretical spectrum had a peak originating from the first nearest neighbor Ru—O component at 1.2 to 1.6 Å, while the measurement spectrum also had a peak equivalent to the first nearest neighbor Bi—O component at 1.2 to 1.8 Å. The peak positions considered to be the second nearest neighbor Ru—O—Ru other than this were also almost identical. These results found that, in the oxygen catalyst of Example 1, Ru was positioned on the B site when assuming the $A_2B_2O_7$ structure.

Furthermore, a FT-EXAFS spectrum at the K edge of Na was compared with a FT-EXAFS spectrum obtained theoretically in each case when assuming Na occupied the A site or the B site in the $A_2B_2O_7$ structure. As the result, the measurement spectrum had a peak intensity smaller than that of each of the A site occupying theoretical spectrum and the B site occupying theoretical spectrum. The measurement spectrum indicated a peak (1) at 1.2 to 2.0 Å and also a peak (2) at 2.0 to 2.8 Å, the longer distance side. On the other hand, the A site occupying theoretical spectrum had a peak originating from the first nearest neighbor Na—O component at 1.6 to 2.6 Å, which was correlated to the peak (2), and the B site occupying theoretical spectrum had a peak originating from the first nearest neighbor Na—O component at 0.7 to 2.1 Å, which was correlated to the peak (1). These results indicated that, in the oxygen catalyst of Example 1, Na exists at the position near the A site and the position near the B site when assuming the $A_2B_2O_7$ structure. As described above, considering high similarity in ionic radius between the +3 valence bismuth ion and +1 valence sodium ion, Na is likely to be positioned more in the vicinity of the A site than the B site, in the structure assuming the $A_2B_2O_7$ structure.

$NaBiO_3$ measured as a reference sample was different from the catalyst according to this embodiment in each of first, the rise of the absorption edge in the XANES spectrum at the K edge of Na, the shape of spectrum, and the main peak position. The FT-EXAFS spectrum at the K edge of Na for $NaBiO_3$ did not indicate two peaks such as the above peak (1) and peak (2). The above further supported that the catalyst according to this embodiment did not include by-products including sodium such as $NaBiO_3$ and that sodium existed in the crystal structure.

The above results found that the oxygen catalyst according to this embodiment had not the pyrochlore structure such as the BRO, but a structure similar to pyrochlore but different from that of the BRO, in which sodium was considered to be arranged in the vicinity of the A site and in the vicinity of the B site in pyrochlore. Furthermore, as a result of performing the analysis identical to the above on the oxygen catalyst of Example 2, a result indicating the trend identical to that of Example 1 for the valence and the atomic distance was obtained.

(Production of Electrode)

Figure 6:
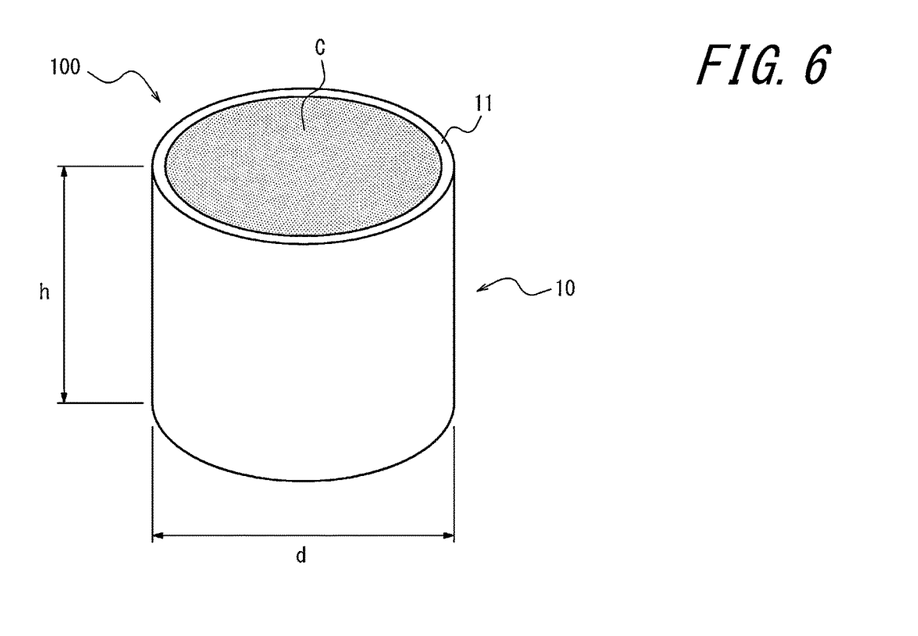
FIG. 6 is a schematic diagram explaining the structure of an electrode.

It was produced an electrode in which each of the oxygen catalysts of Example 1 and Example 2 and the oxide of Comparative Example 1 was supported on a titanium disk, which was a conducting material, in the following method. First, the oxygen catalyst or the oxide was ground in a mortar. Then, the ground powder was added to a sample bottle to be 3.77 g/L using distilled water as a dispersion medium, and ultrasonic dispersion was performed at an ultrasonic generator for 2 hours to obtain the suspension. As illustrated in FIG. 6, a cylindrically formed titanium disk 10 (diameter d of 4.0 mm, height h of 4.0 mm, hereinafter, referred to as the titanium disk 10) was put in acetone to be subjected to ultrasonic cleaning, and then, the above suspension was dropped with 10 µL on one surface 11 (one-side bottom surface of the cylinder) of the titanium disk and naturally dried for 24 hours, obtaining an electrode 100 in which the oxygen catalyst or the oxide was supported in the form of a uniform film on the one surface 11 of the titanium disk 10. FIG. 6 indicates the oxygen catalyst or the oxide, which is supported in the film form, as an oxide layer C. No fixative was used when fixing the oxygen catalyst or the oxide to the titanium disk 10.

(Electrochemical Measurement)

The aforementioned electrode was mounted on a rotating electrode device to be a working electrode. This working electrode and a platinum plate (area: 25 cm$^2$) were immersed in 0.1 mol/L potassium hydroxide aqueous solution in an identical container. The pH of the potassium hydroxide aqueous solution was 13 or more. In another container, a commercially available mercury/mercury oxide electrode similarly immersed in 0.1 mol/L potassium hydroxide aqueous solution was prepared. These two potassium hydroxide aqueous solutions were connected one another through a liquid junction similarly filled with 0.1 mol/L potassium hydroxide aqueous solution. Using a three-electrode electrochemical cell having such configuration, the electrochemical measurement was performed by adjusting the temperature of the aqueous solution at 25° C. The measurement was performed by the linear sweep voltammetry, using a commercially available electrochemical measurement device and electrochemical software. The linear sweep voltammetry is a method of measuring the current flowing through the working electrode while changing the potential of the working electrode at a constant scanning rate. The current flowing during this measurement is a current of the reaction that occurs in the oxygen catalyst supported on the electrode. That is, the titanium disk alone does not cause the reduction of oxygen and the generation of oxygen in a wide potential range, and the above measurement method thus can measure the reaction current that occurs only in the oxide layer C.

The measurement of an oxygen reduction current was performed as follows. First, nitrogen was blown into the aqueous solution in which the working electrode was immersed at a flow rate of 30 mL/min for 2 hours or more. Then, after removing dissolved oxygen, the measurement was performed while blowing nitrogen. After this, oxygen was blown at the identical flow rate for 2 hours or more, and the measurement was performed again while further blowing oxygen. Then, a value obtained by subtracting the current measured while blowing nitrogen from the current measured while blowing oxygen was set as the reduction current of oxygen. A value obtained by dividing this oxygen reduction current by the surface area of the titanium disk was set as an oxygen reduction current density. The thus obtained result indicating the relationship between the potential of the working electrode and the oxygen reduction current density was used for creating the Tafel plot described later. During the above measurement, the working electrode was used with being rotated at 1600 rpm (min$^{-1}$). Specifically, the electrode was mounted on the rotating disk electrode device with the surface (one surface 11), to which the oxygen catalyst of the titanium disk 10 was fixed, downward (one example of the rotating disk electrode), and it was rotated at a constant rate in a state in which the oxygen catalyst was immersed in the electrolytic solution. Such measurement is called a Rotating Disk Electrode (RDE) method. The scanning rate that means an amount of change of the potential per unit of time was set to 1 mV/s.

After performing the above-described measurement of the oxygen reduction current, an oxygen generation current was measured. The measurement of the oxygen generation current was performed under atmosphere open conditions without blowing nitrogen and oxygen. The oxygen generation is a reaction that oxygen is generated from hydroxide ions, and thus it has no relation with the blowing of nitrogen and oxygen. The measurement of the oxygen generation current was also performed by the linear sweep voltammetry at a scanning rate of 1 mV/s, while rotating the working electrode at 1600 rpm, similarly to that of the oxygen reduction current.

(Specific Activity)

Figure 7:
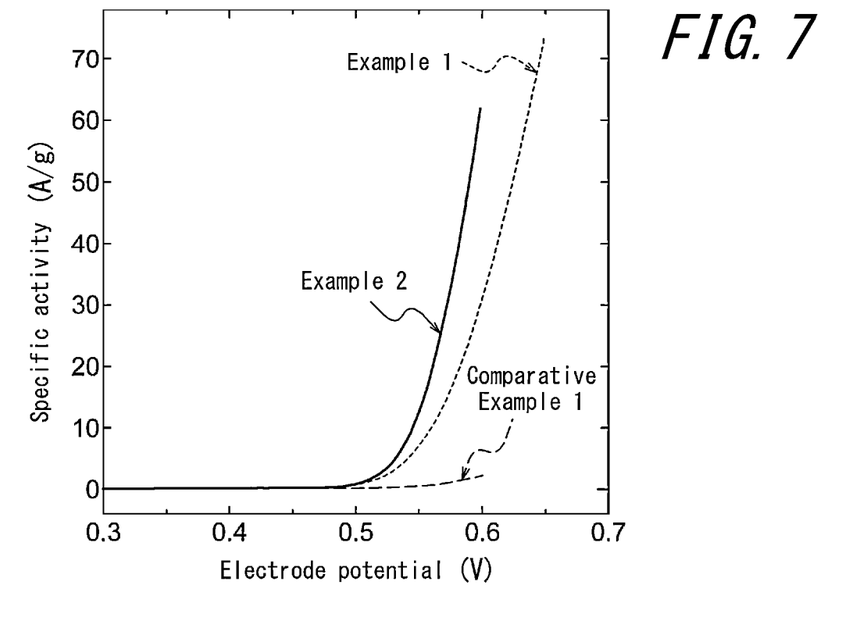
FIG. 7 is a relationship diagram between the specific activity and the electrode potential for the oxygen generation of electrodes of Example 1, Example 2, and Comparative Example 1.
Figure 8:
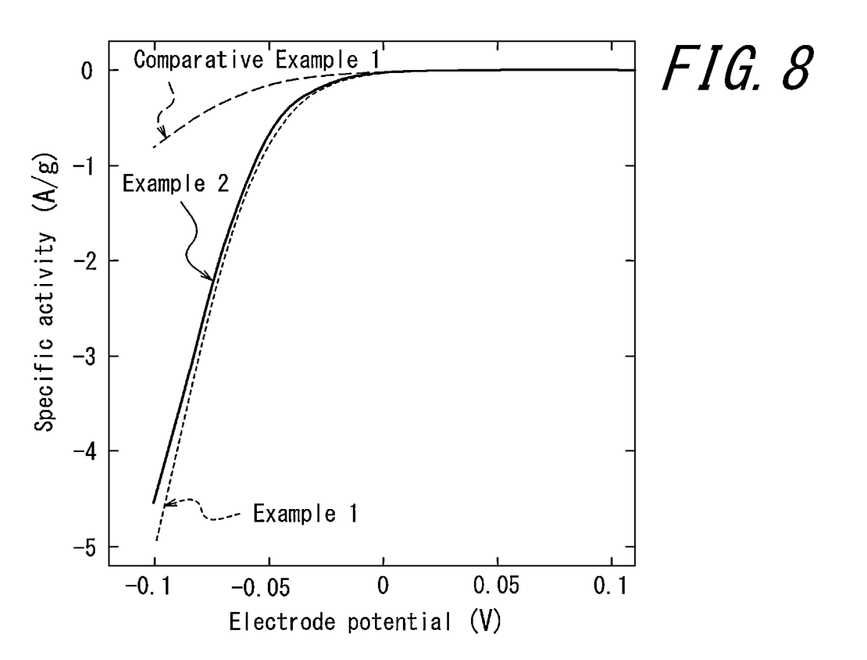
FIG. 8 is a relationship diagram between the specific activity and the electrode potential for the oxygen reduction of the electrodes of Example 1, Example 2, and Comparative Example 1.

For the linear sweep voltammogram obtained in the above method (the result indicating the relationship between the potential and the current of the working electrode, which was obtained by the linear sweep voltammetry), in order to remove the influence by the difference in amount of the supported oxygen catalyst, a value obtained by dividing a current value (A) during the oxygen reduction or the oxygen generation by the catalyst weight (g) was used as a specific activity. The unit of the specific activity is A/g. The supported amount of the oxygen catalyst was 35 µg to 43 µg. FIG. 7 illustrates the thus created result of the electrode potential and the specific activity for the oxygen generation. FIG. 8 illustrates the result of the electrode potential and specific activity for the oxygen reduction. The short dashed line, the solid line, and the long dashed line in FIG. 7 and FIG. 8 represent Example 1, Example 2, and Comparative Example 1, respectively.

When comparing the specific activities at an electrode potential of 0.6 V from the result in FIG. 7, it was found that Example 1 was 14.5 times and Example 2 was 29.0 times as high as Comparative Example 1, and thus Example 1 and Example 2 had catalytic activities 10 times or higher than that of Comparative Example 1. Similarly, comparing the specific activities at an electrode potential of −0.1 V from the result in FIG. 8, it was found that Example 1 was 6.6 times and Example 2 was 6.1 times as high as Comparative Example 1, and thus Example 1 and Example 2 had catalytic activities 6 times or higher than that of Comparative Example 1 also in the oxygen reduction.

As above, it was found that the oxygen catalyst according to this embodiment had high catalytic activity both in the oxygen generation and the oxygen reduction.

(Tafel Slope)

From the aforementioned linear sweep voltammogram, according to the rule, by organizing the common logarithm of the current density of the oxygen reduction or the oxygen generation on the horizontal axis and the potential on the vertical axis (hereinafter, such organized result is referred to as the Tafel plot), the slope at a part of the straight line in the Tafel plot, that is, the Tafel slope was obtained. The Tafel slope is an amount of change of the potential required to increase the current 10 times for various electrochemical reactions in addition to the reduction of oxygen and the generation of oxygen, which is normally represented using V/dec (dec is an abbreviation of decade that means 10 times) as a unit. Here, the Tafel slope is a positive value in the oxidation reaction and a negative value in the reduction reaction. In each case, the smaller absolute value means the higher catalytic activity. In the following, the magnitude of the Tafel slope is written in terms of the absolute value.

On the other hand, the reactions of the oxygen generation and the oxygen reduction are known as the reactions that have large Tafel slopes and are less likely to occur, among the electrochemical reactions. For example, even in the case of platinum that is known to have high catalytic activity, the absolute value of the Tafel slope is 60 mV/dec or more in each of the oxygen generation and the oxygen reduction. Very few catalysts exhibit smaller Tafel slopes than that of platinum. However, the Tafel slope in the oxygen catalyst of Example 1 was 44 mV/dec in the oxygen generation and −43 mV/dec in the oxygen reduction, and the Tafel slope in the oxygen catalyst of Example 2 was 39 mV/dec in the oxygen generation and −41 mV/dec in the oxygen reduction. The Tafel slopes in the oxygen catalysts of Example 1 and Example 2 were decreased by 25% or more in both oxygen generation and oxygen reduction, with respect to the Tafel slopes of platinum, which exhibited that the oxygen catalysts of Example 1 and Example 2 had extremely high catalytic activities.

For the oxygen catalysts of Example 1 and Example 2, the aforementioned measurement of the current for the oxygen generation and the oxygen reduction was repeatedly performed about 10 times, but there was no change in measurement result. However, for the oxygen catalyst of Comparative Example 1, when the measurement was repeated 2 to 3 times, the current decreased, and the potassium hydroxide aqueous solution used in the measurement was colored, which suggested dissolution of the constituent elements from the oxygen catalyst of Comparative Example 1. The results of Comparative Example 1 illustrated in FIG. 7 and FIG. 8 are both initial measurement results.

INDUSTRIAL APPLICABILITY

The oxygen catalyst and the electrode according to this embodiment can be used as the catalyst for the oxygen generation, the oxygen reduction, or both of them, in a battery, an electrolytic device, and a sensor that use the oxygen reduction, the oxygen generation, or both reactions using an alkali aqueous solution as an electrolyte, in addition to the air electrodes of the air primary battery and the air secondary battery, the oxygen cathode of the brine electrolysis, the cathode of the alkaline fuel cell, and the anode of the alkaline water electrolysis. The electrode according to this embodiment can be used for an electrode as a standard sample or a comparison reference sample in the catalytic activity evaluation used for the electrochemical measurement or the electrochemical analysis, a detection electrode used in the electrochemical analysis or an electrochemical sensor, etc.

REFERENCE SIGNS LIST

10 disk (titanium disk, titanium)
11 one surface (surface)
100 electrode
C oxide layer (oxygen catalyst, oxide)

The invention claimed is:

1. An oxygen catalyst in a system that uses an alkali aqueous solution as an electrolyte, the oxygen catalyst being an oxide having peaks at positions of $2\theta=30.07°\pm1.00°$, $34.88°\pm1.00°$, $50.20°\pm1.00°$, and $59.65°\pm1.00°$ in an X-ray diffraction measurement using a CuKα ray and having constituent elements of bismuth, ruthenium, sodium, and oxygen, wherein an atom ratio of the oxygen to the bismuth, O/Bi and an atom ratio of the oxygen to the ruthenium, O/Ru are both more than 3.5.

2. The oxygen catalyst according to claim 1, wherein the atom ratio O/Bi and the atom ratio O/Ru are both more than 3.5, and both 4 or less.

3. The oxygen catalyst according to claim 2, wherein, for the bismuth, the ruthenium, the sodium, and the oxygen, a total charge ratio expressed in the following formula is 0.9 or more and 1.1 or less:

total charge ratio=(total charge number of anions)/(total charge number of cations).

4. The oxygen catalyst according to claim 3, wherein an atom ratio Na/Ru of the sodium to the ruthenium is $0.285\pm0.015$.

5. The oxygen catalyst according to claim 4, wherein an atom ratio (Bi+Na)/Ru, where (Bi+Na) is the sum of atoms of bismuth and sodium, and Ru is the number of atoms of ruthenium, is $1.285\pm0.010$.

6. The oxygen catalyst according to claim 5, wherein a ratio (3Bi+Na)/4Ru, where (3Bi+Na) is the sum of the total charge number of bismuth and the total charge number of sodium, and 4Ru is the total charge number of ruthenium multiplied by 4, is $0.820\pm0.020$.

7. An electrode comprising the oxygen catalyst according to claim 6.

8. An electrode wherein the oxygen catalyst according to claim 6 is supported on titanium.

9. The oxygen catalyst according to claim 1, wherein, for the bismuth, the ruthenium, the sodium, and the oxygen, a total charge ratio expressed in the following formula is 0.9 or more and 1.1 or less:

total charge ratio=(total charge number of anions)/(total charge number of cations).

10. The oxygen catalyst according to claim 1, wherein an atom ratio Na/Ru of the sodium to the ruthenium is $0.285\pm0.015$.

11. The oxygen catalyst according to claim 1, wherein an atom ratio (Bi+Na)/Ru, where (Bi+Na) is the sum of atoms of bismuth and sodium, and Ru is the number of atoms of ruthenium, is $1.285\pm0.010$.

12. The oxygen catalyst according to claim 1, wherein a ratio (3Bi+Na)/4Ru, where (3Bi+Na) is the sum of the total charge number of bismuth and the total charge number of sodium, and 4Ru is the total charge number of ruthenium multiplied by 4, is $0.820\pm0.020$.

13. An electrode comprising the oxygen catalyst according to claim 1.

14. The electrode according to claim 13 being any of an air electrode of an air primary battery, an air electrode of an air secondary battery, an oxygen cathode of brine electrolysis, a cathode of an alkaline fuel cell, or an anode of alkaline water electrolysis.

15. An electrode wherein the oxygen catalyst according to claim 1 is supported on titanium.

16. The electrode according to claim 15, wherein the oxygen catalyst is supported on the bottom surface of the titanium that is cylindrically formed.

* * * * *